(12) United States Patent
Granger et al.

(10) Patent No.: US 9,134,518 B1
(45) Date of Patent: Sep. 15, 2015

(54) MULTIPLE-SENSOR COMMON-INTERFACE TELESCOPE (75) Inventors: Zachary A. Granger, Redwood City, CA (US); Raymond M. Bell, Redwood City, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 261 days.

(21) Appl. No.: 13/244,122

(22) Filed: Sep. 23, 2011

Related U.S. Application Data (60) Provisional application No. 61/385,799, filed on Sep. 23, 2010.

(51) Int. Cl.
*G02B 5/10* (2006.01)
*G02B 17/08* (2006.01)

(52) U.S. Cl.
CPC ............... *G02B 17/082* (2013.01); *G02B 5/10* (2013.01)

(58) Field of Classification Search
CPC ............ G02B 5/08–5/10; G02B 23/00–23/26; G02B 17/00–17/0896
USPC ............................ 359/364–366, 399, 838–884
See application file for complete search history.

(56) References Cited

U.S. PATENT DOCUMENTS

| | | | | |
|---|---|---|---|---|
| 3,532,410 A * | 10/1970 | La Roche | ...................... | 359/363 |
| 3,614,449 A * | 10/1971 | Ward, III | ...................... | 359/366 |
| 4,101,195 A * | 7/1978 | Frosch et al. | ................. | 359/366 |
| 4,964,706 A * | 10/1990 | Cook | ............................. | 359/366 |
| 4,993,818 A * | 2/1991 | Cook | ............................. | 359/366 |
| 6,333,811 B1 * | 12/2001 | Tatian et al. | ................... | 359/366 |
| 6,970,286 B1 * | 11/2005 | Kunick | ......................... | 359/366 |
| 7,031,059 B1 * | 4/2006 | Costes | .......................... | 359/464 |
| 7,099,077 B2 * | 8/2006 | Cook | ............................. | 359/432 |
| 8,123,371 B2 * | 2/2012 | Cook | ............................. | 359/859 |
| 8,427,744 B2 * | 4/2013 | Cook | ............................. | 359/399 |
| 8,534,851 B2 | 9/2013 | Spencer | | |
| 2010/0202073 A1 * | 8/2010 | Cook | ............................. | 359/858 |
| 2011/0188139 A1 * | 8/2011 | Bentley et al. | ................ | 359/859 |
| 2012/0019943 A1 * | 1/2012 | Spencer | ........................ | 359/859 |

* cited by examiner

*Primary Examiner* — Stephone B Allen
*Assistant Examiner* — Jeffrey Madonna
(74) *Attorney, Agent, or Firm* — McDermott Will & Emery LLP (57) ABSTRACT

A telescope is disclosed that includes a primary mirror configured to accept at a front surface incoming light from a field of view (FOV) and reflect the incoming light. The telescope also includes a secondary mirror that is coupled to the primary mirror and configured to accept the light reflected by the primary mirror and further reflect the light from the primary mirror. The telescope also includes one or more tertiary mirrors coupled to and disposed behind the primary mirror. Each tertiary mirror is configured to accept a portion of the light reflected by the second mirror. Each tertiary mirror is also configured to reflect the light so as to form an exit pupil and create an image on a flat image surface disposed behind the primary mirror. Each exit pupil does not overlap another exit pupil.

18 Claims, 5 Drawing Sheets

MULTIPLE-SENSOR COMMON-INTERFACE TELESCOPE

CROSS-REFERENCE TO RELATED APPLICATIONS

This application claims priority to Provisional Application No. 61/385,799 filed on Sep. 23, 2010, the contents of which are hereby incorporated herein by reference.

STATEMENT REGARDING FEDERALLY SPONSORED RESEARCH OR DEVELOPMENT

Not applicable.

BACKGROUND

1. Field

The present disclosure generally relates to optical telescopes and, in particular, to telescopes having multiple sensors sharing a common primary reflector.

2. Description of the Related Art

Optical telescopes are often built to accommodate a single instrument at a time with the mounted instrument observing the entire field of view (FOV) of the telescope. As it is common to make observations with a variety of instruments, such as imaging cameras, photometers, and spectrometers, these instruments must be swapped into the single mounting location. The process of swapping instrument may take up valuable observation time, if the instruments are changed during an observation period, and may require calibration of the newly installed instrument, further consuming time. In addition, there is always risk of damage when handling an instrument and so every instrument swap risks both instruments. Finally, it is impossible in such a system to make simultaneous observations within a FOV.

Some telescopes are designed to allow multiple instruments to simultaneously make observations of the entire FOV by providing a beam splitter in the optical path such that a portion of the light from the entire FOV is reflected by the splitter to a first instrument while the remaining light passes through the splitter to a second instrument. This type of system may provide different optical characteristics for the two instruments as the reflected light may experience different spectral filtering depending on the reflective and transmissive characteristics of the splitter.

Some telescopes are designed to allow multiple instruments to simultaneously make observations of portions of the FOV. For example, the Hubble Space Telescope (HST) carried five instruments that each observed a separate portion of the FOV of the telescope. The five instrument interfaces were not identical, however, and the optical paths from the primary mirror to the five mounting interfaces were not identical. The Wide Field/Planetary Camera, for example, could not be interchanged with the Faint Object Camera. The optical design of the HST did not produce real exit pupils in the optical path, thereby limiting the ability to block off-axis light reflected from internal structures.

SUMMARY

There is a need to provide a system and method that allows multiple instruments to simultaneously observe portions of a telescope's FOV wherein the optical characteristics of the light received by each instrument are sufficiently identical to enable a common optical interface when desired. A common optical interface requires matching one or more first-order optical properties such as f-number (f/#), principal plane locations, exit pupil locations, back focal length, and exit pupil diameter. In addition, it may be desirable to provide identical mechanical and electrical interfaces such that an instrument can be mounted in any of a plurality of mounting locations without detriment to the operation of the instrument or degradation of the observations made by the instrument. Location of the optical elements behind the primary mirror and the structure facilitates provision of a common mechanical interface.

In certain embodiments, a telescope is disclosed that includes a primary mirror configured to accept at a front surface incoming light from a FOV and reflect the incoming light. The telescope also includes a secondary mirror that is coupled to the primary mirror and configured to accept the light reflected by the primary mirror and further reflect the light from the primary mirror. The telescope also includes a plurality of tertiary mirrors that are coupled to and disposed behind the primary mirror. The telescope also includes one or more tertiary mirrors coupled to and disposed behind the primary mirror. Each tertiary mirror is configured to accept a portion of the light reflected by the second mirror. Each tertiary mirror is also configured to reflect the light so as to form a real exit pupil and create an image on a flat image surface disposed behind the primary mirror. Each exit pupil does not overlap another exit pupil.

In certain embodiments, a telescope is disclosed that includes a primary mirror configured to accept at a front surface incoming light from a FOV and reflect the incoming light. The telescope also includes a secondary mirror coupled to the first mirror. The second mirror is configured to accept the light reflected by the primary mirror and further reflect the light from the primary mirror. The telescope also includes a plurality of optical subsystems disposed behind the primary mirror. Each subsystem is configured to accept the incoming light from a separate portion of the FOV. Each subsystem includes a first planar mirror, a tertiary mirror, a second planar mirror, and a structure coupled to the primary mirror. The structure is configured to couple to and position the tertiary mirror and the first and second planar mirrors at respective points along an optical path so as to cooperate with the primary and secondary mirrors to form an exit pupil and an image on a flat image surface.

In certain embodiments, a method of sharing a FOV of a telescope is disclosed. The method includes the steps of reflecting with a front surface of a primary mirror incoming light from the FOV, reflecting with a secondary mirror the light reflected by the primary mirror, and reflecting with a first tertiary mirror a first portion of the light reflected by the secondary mirror so as to form, in cooperation with the first and second mirrors, a first optical path having a first exit pupil and a first final image on a first flat image surface. The method also includes the step of reflecting with a second tertiary mirror a second portion of the light reflected by the secondary mirror so as to form, in cooperation with the first and second mirrors, a second optical path having a second real exit pupil that does not overlap the first real exit pupil and a second final image on a second flat image surface that does not overlap the first flat image surface.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

The method and system disclosed herein are presented in terms of an optical light reflecting telescope adapted for astronomical use. Nothing in this disclosure should be interpreted, unless specifically stated as such, to limit the application of any method or system disclosed herein to optical frequencies of light or astronomical use.

In the following detailed description, numerous specific details are set forth to provide a full understanding of the present disclosure. It will be apparent, however, to one ordinarily skilled in the art that embodiments of the present disclosure may be practiced without some of the specific details. In other instances, well-known structures and techniques have not been shown in detail so as not to obscure the disclosure.

Figure 1:
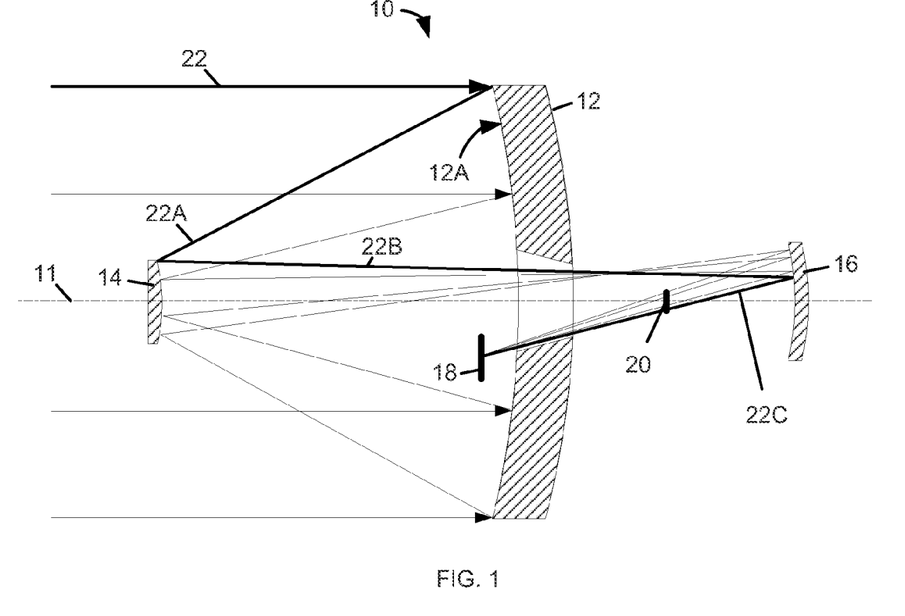
FIG. 1 is a cross-sectional lateral view of an exemplary multiple-sensor common-interface telescope according to certain aspects of this disclosure.

FIG. 1 is a cross-sectional lateral view of an exemplary multiple-sensor common-interface telescope 10 according to certain aspects of this disclosure. Incoming light 22 strikes a front surface 12A of a first concave reflecting mirror 12. The first mirror 12 reflects the light along path 22A to a secondary convex reflecting mirror 14 that further reflects the light 22A received from the primary mirror 12 along path 22B. A concave tertiary mirror 16 that is disposed behind primary mirror 12, i.e. on the side of primary mirror 12 that is opposite the front reflecting surface 12A, accepts a portion of the light 22B from the secondary mirror 14 and reflects this accepted light along path 22C. The tertiary mirror 16 is configured such that, in conjunction with the primary mirror 12 and secondary mirror 14, a real exit pupil 20 is formed along the path 22C and then an image is formed on a flat image surface 18. In this embodiment, the image surface 18 is disposed in front of the primary mirror 12 and this position poses certain challenges for the designer as the imaging apparatus (not shown) located at the image surface 18 may obstruct a portion of the incoming light 22. It may also be difficult to provide a mounting structure (not shown) for equipment to be mounted at the image surface 18 with sufficient stiffness at an acceptable weight.

In the embodiment of FIG. 1, the optical elements, i.e. the primary mirror 12, the secondary mirror 14, and the tertiary mirror 16, are aligned on centerline 11 and combine to place the exit pupil 20 at a location that is also on the centerline 11. A second flat image surface (not shown) can be placed at a location above, in the orientation of FIG. 1, the centerline and matching the position of image surface 18. The light rays that reach this second image surface would pass through the same exit pupil 20. It would therefore be impossible to have a separate stop or filter at the exit pupil for instruments using the two image surfaces.

While the telescope 10 of FIG. 1 embodies the desirable attributes of the disclosed system, the difficulties in mounting an instrument at the location of image surface 18 and the commonality of the exit pupil for multiple image surfaces may limit the practical effectiveness of this design.

Figure 2:
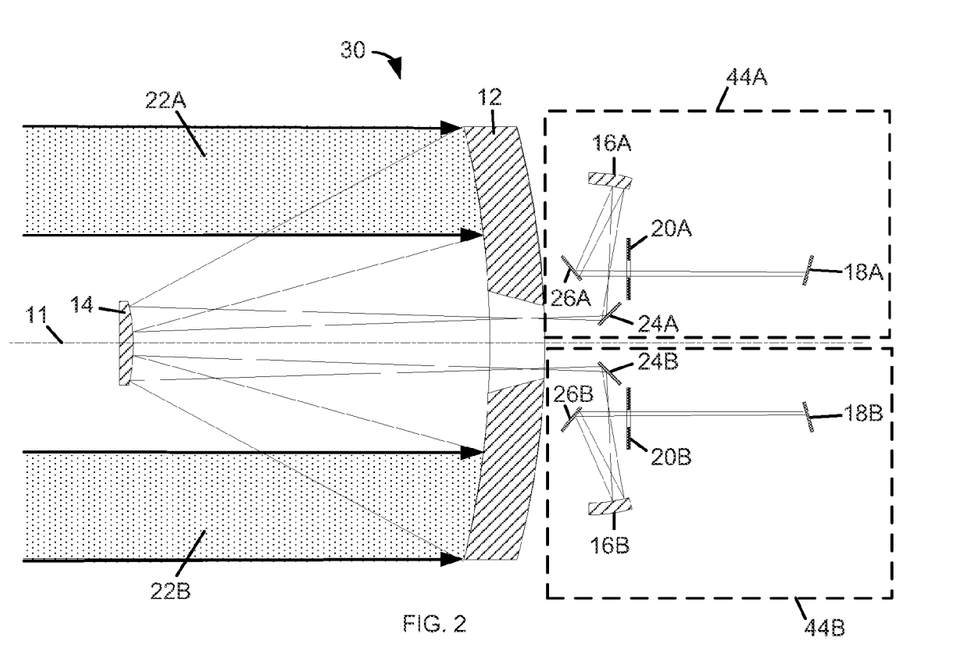
FIG. 2 is a cross-sectional lateral view of another embodiment of an exemplary multiple-sensor common-interface telescope according to certain aspects of this disclosure.

FIG. 2 is a cross-sectional lateral view of another embodiment of an exemplary multiple-sensor common-interface telescope 30 according to certain aspects of this disclosure. In this embodiment, a pair of folding mirrors 24 and 26 have been introduced into the optical path to redirect the light and position the exit pupil 20 and flat image surface 18 in more advantageous positions. FIG. 2 depicts two subsystems 44A and 44B that each contain an identical set of optical elements that include a first folding mirror 24A, 24B, a tertiary mirror 16A, 16B, a second folding mirror 26A, 26B, an exit pupil 20A, 20B, and a flat image surface 18A, 18B. Elements having an "A" or "B" suffix are equivalent elements of the two subsystems 44A, 44B.

Each subsystem 44A, 44B receives light from a different portion of the FOV. These different portions are shown as incoming light 22A and 22B, which are guided to subsystems 44A and 44B, respectively. This shared FOV is discussed in greater detail with respect to FIGS. 4-6. While the light paths corresponding to paths 22A and 22B may overlap or intersect in telescope 30, the light paths become separate in this embodiments once the light reaches the first folding mirror 24A, 24B.

By folding the optical paths 22B and 22C from FIG. 1 as shown in FIG. 2, the exit pupils 20A and 20B are now separate and contained within the respective subsystems 4A, 44B. The image surfaces 18A and 18B are now positioned behind the primary mirror 12 such that there is no potential for obscuration of the incoming light 22 by supporting structure or instruments associated with the image surfaces 18A, 18B.

It will be apparent that the particular positions of the optical elements in the telescope 30 are only exemplary and that positions of any or all of the elements can be changed without departing from the spirit of the disclosure. In certain embodiments, for example, the second folding mirrors 26A, 36B are omitted and the light passes directly from the tertiary mirrors 16A, 16B to the respective image surfaces 18A, 18B. In certain embodiments, one or more of the image surfaces 18A, 18B are omitted and alternate light sensing devices (not shown), such as photometers or spectrometers, substituted. In certain embodiments, the folding mirrors 24A, 24B and 216A, 26B and the tertiary mirrors 16A, 16B are repositioned to direct the light outward away from the centerline 11 such that the image surfaces 18A, 18B are near the edge of the mirror 12.

Figure 3:
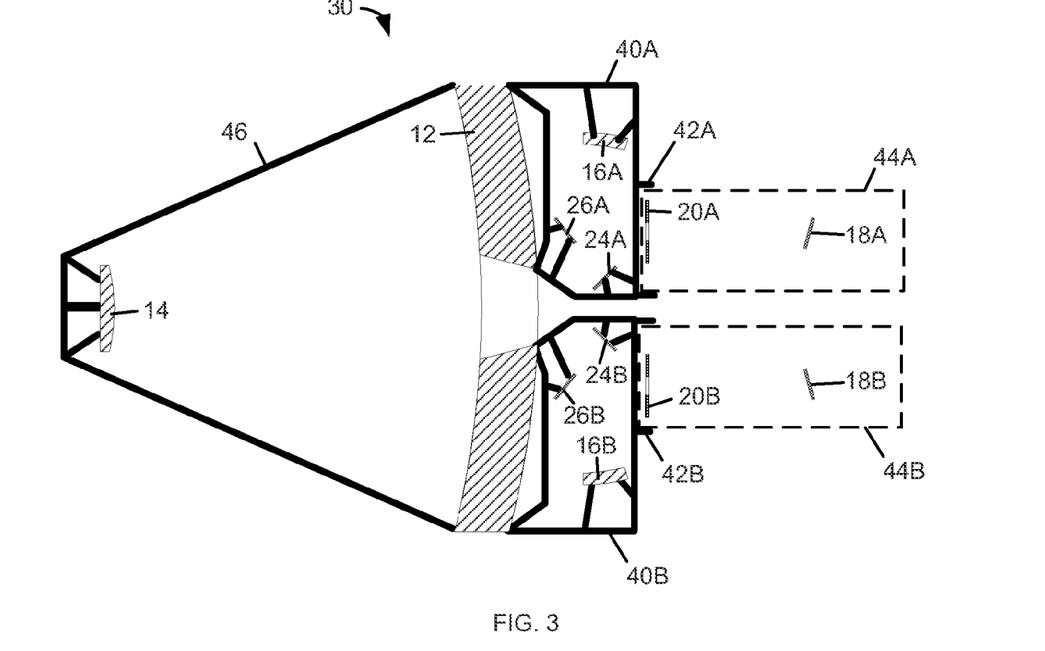
FIG. 3 depicts the telescope of FIG. 2 with supporting systems for the optical elements and interchangeable instrument modules according to certain aspects of the disclosure.

FIG. 3 depicts the telescope 30 of FIG. 2 with supporting systems 40A, 40B for the optical elements and interchangeable instrument modules 44A, 44B according to certain aspects of the disclosure. A truss 46 is coupled to the primary mirror 12 and the secondary mirror 14. A first supporting system 40A is coupled to the primary mirror 12 and also to the optical elements 24A, 16A, 26A. The first supporting structure also provides a first mounting interface 42A to which instrument modules, such as indicated by the dashed-line box 44A, can be coupled.

The second supporting structure 40B is coupled to the primary mirror 12 and also to the optical elements 24B, 16B, 26B and provides a mounting interface 42B. In certain embodiments, the physical characteristics of the mounting interfaces 42A, 42B are identical such that an instrument capable of coupling to one can couple to the other without modification. In certain embodiments, the optical characteristics of the light path from the primary mirror 12 to the mounting interfaces 42A, 42B are identical such that the optical characteristics of the light at the mounting interfaces 42A, 42B are identical. In certain embodiments, the spectral characteristics of the light at the mounting interfaces 42A, 42B are identical. In certain embodiments, the length of the light path from the primary mirror 12 to the mounting interfaces 42A, 42B are identical. In certain embodiments, the focal ratios of the optical system from the primary mirror 12 to the mounting interfaces 42A, 42B are identical.

The interchangeable instrument modules 44A, 44B are essentially a common specification and interface description for the design of instruments to be used with the telescope 30. The locations of the exit pupils and flat image surfaces within the specified volume are determined but under the control of the designer of the instrument. For example, additional optical elements, such as filters or collimators, may be added to the optical path to provide the desired manipulation of the optical and spectral characteristics. An instrument designed to this specification and interface description can be installed in any of the mounting interfaces 42A, 42B, etc. without impact on their performance or output data quality. As the optical characteristics are equivalent at each interface 42A, 42B, etc., it is even possible to move an instrument from one mounting interface to another in order to accommodate repairs or a reconfiguration of the system.

Figure 4:
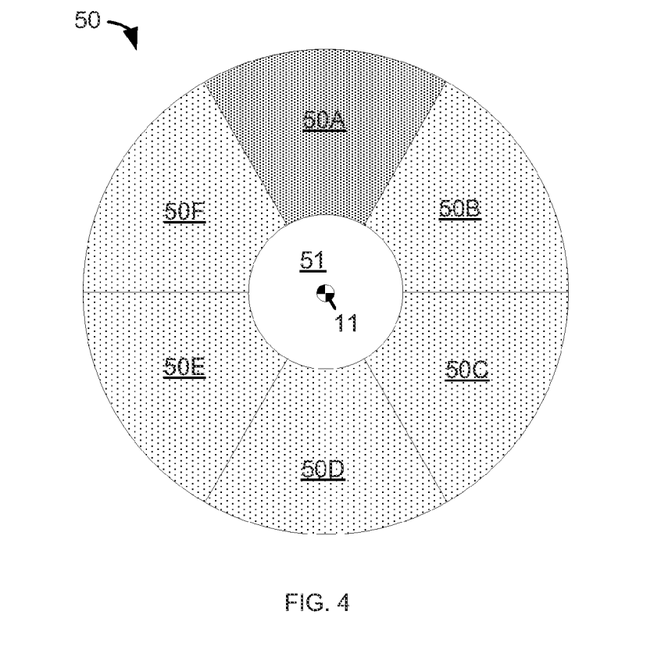
FIG. 4 depicts an exemplary shared FOV of the telescope of FIG. 2 according to certain aspects of this disclosure.

FIG. 4 depicts an exemplary shared FOV 50 of the telescope 30 of FIG. 2 according to certain aspects of this disclosure. The FOV 50 has a center area 51 that is obstructed by the secondary mirror 14. In this embodiment, the remaining toroidal shaped area is divided into six portions 50A-50F that are equal in size and shape and are symmetrically distributed about the center axis 11. In certain embodiments, the portions 50A-50F are separated from each other by a small gap (not shown). In certain embodiments, the number of portions is at least two. In certain embodiments, the number of portions is greater than two.

Figure 5:
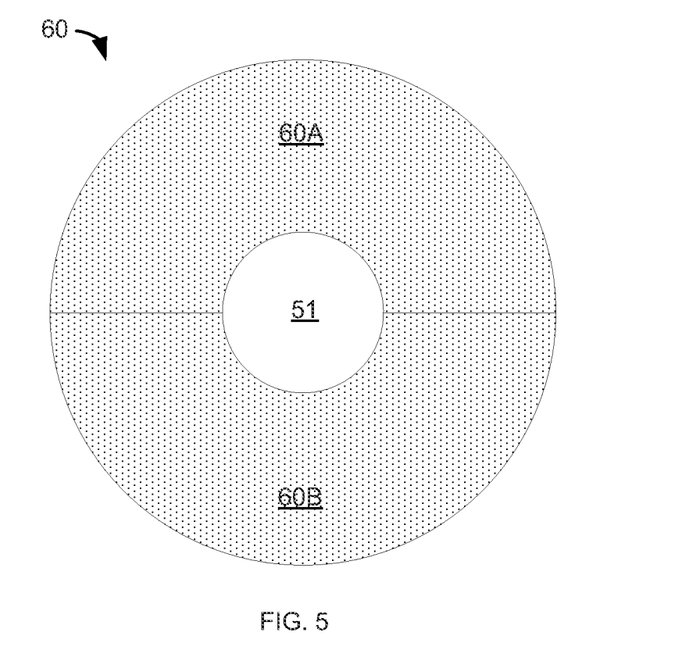
FIG. 5 depicts another embodiment of a shared FOV of the telescope of FIG. 2 according to certain aspects of this disclosure.

FIG. 5 depicts another embodiment of a shared FOV 60 of the telescope 30 of FIG. 2 according to certain aspects of this disclosure. In this embodiment, the FOV 60 is divided into two portions 60A, 60B that are equal in size and shape. The first portion 60A comprises the portions 50F, 50A, and 50B of the embodiment of FIG. 4 and the second portion 60B comprises the portions 50E, 50D, and 50C.

Figure 6:
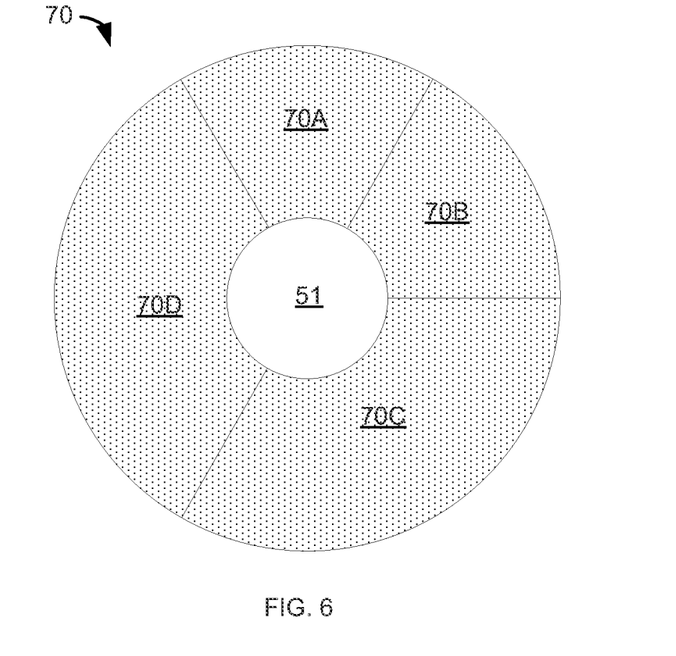
FIG. 6 depicts another embodiment of a shared FOV of the telescope of FIG. 2 according to certain aspects of this disclosure.

FIG. 6 depicts another embodiment of a shared FOV 70 of the telescope 30 of FIG. 2 according to certain aspects of this disclosure. In this embodiment, the FOV 70 is divided into four portions 70A-70D. Portions 70A and 70B each comprise approximately ⅙ of the FOV 70 and are equal in size and shape to each other. Portions 70C and 70D each comprise approximately ⅓ of the FOV 70 and are equal in size and shape to each other. In other embodiments, the FOV 70 comprises at least two portions that are equal in size and shape to each other as well as at least one additional portion, for example equal to the sum of portions 70C and 70D in FIG. 6, that is not equal to the first two portions.

Figure 7:
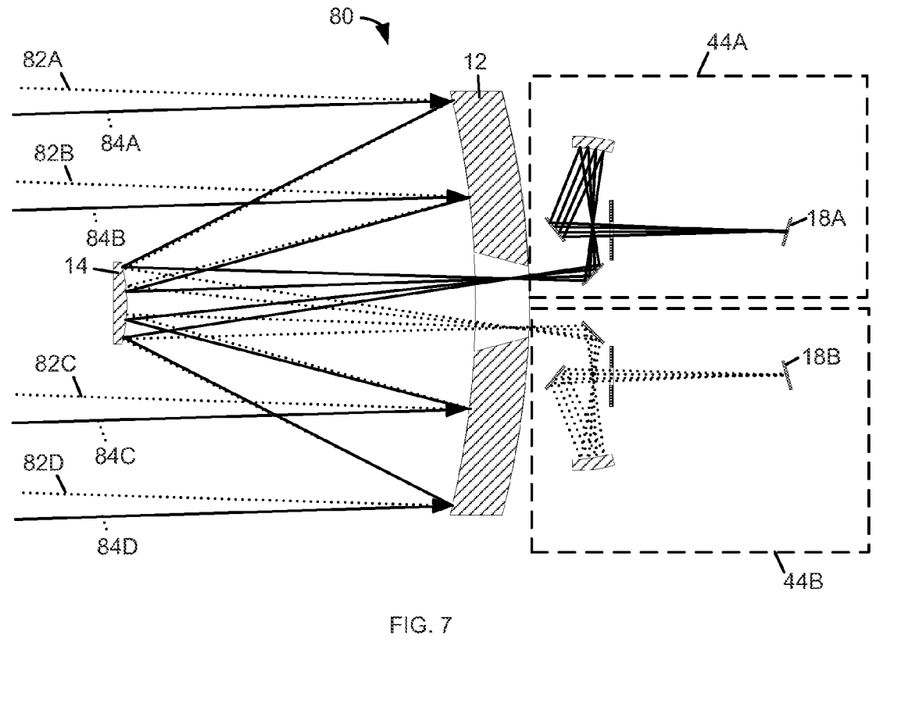
FIG. 7 is a cross-sectional lateral view of an another embodiment of a multiple-sensor common-interface telescope according to certain aspects of this disclosure.

FIG. 7 is a cross-sectional lateral view of an another embodiment of a multiple-sensor common-interface telescope 80 according to certain aspects of this disclosure. In this embodiment, each instrument 44A, 44B uses the entire area of the primary mirror 12 to capture incoming light. Each instrument 44A, 44B captures light coming in at a different angle, shown as a first set of light rays 82A-82D coming in at a common first angle and a second set of light rays 84A-84D coming in at a common second angle. Each light ray in a set is, in this example, coming from a single point in the sky. Each of the corresponding rays, for example 82A and 84A, reflect from a common point on the primary mirror 12. As the incident angle of rays 82A and 84A are different, the rays 82A and 84A reflect at different angles and follow separate paths. The paths of the first set of light rays 82A-82D are shown as solid lines while the paths of the second set of light rays 84A-84D are shown as dotted lines. It can be seen that all of the rays 82A-82D converge to a single point on image surface 18A while all of the rays 84A-84D converge to a single point on image surface 18B. This shared use of the entire surface of primary mirror 12 increases the total light gathering capability of each instrument 44A, 44B. The interface to each instrument location remains identical and instruments can be interchanged among the positions, such as exchanging instruments 44A and 44B in FIG. 7, with the only effect being a slightly different FOV.

Figure 8:
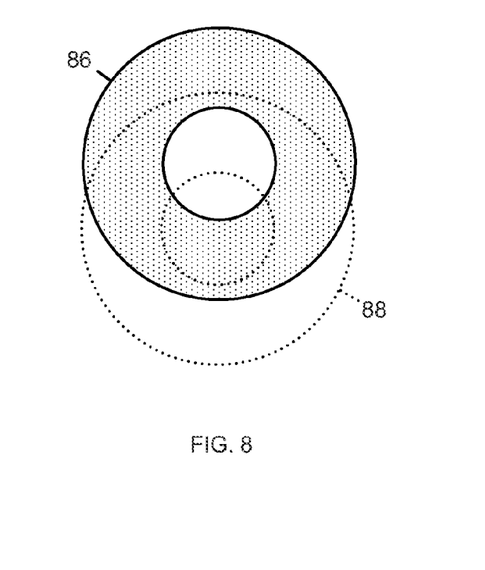
FIG. 8 depicts the FOVs of instruments sharing the telescope of FIG. 7 according to certain aspects of this disclosure.

FIG. 8 depicts the FOVs 86, 88 of instruments 44A, 44B sharing the telescope 80 of FIG. 7 according to certain aspects of this disclosure. Each FOV 86, 88 is a toroid covering the entire FOV of the telescope 80. The offset of FOV 88 for instrument 44B from the FOV 86 of instrument 44A is not shown to scale. In certain embodiments, each FOV 86, 88 is independent of the other and, as such, each tertiary mirror 16A, 16B is also independent of the other.

One advantage of the telescope configuration of FIG. 7 having the shared FOVs as shown in FIG. 8 is the reduction in maneuvering required of a satellite making an observation of a single event with more than one of the instruments. For example, if an interplanetary satellite was traveling past a moon and it was desired to observe a certain portion of the surface with two different instruments, a satellite carrying separate telescopes for each instrument would have to perform a maneuver of tens of degrees or more to switch from the first telescope-instrument set to the second telescope-instrument set. A maneuver of this magnitude takes time and may experience a thermal or communication impact due to the change in attitude. The multiple-sensor common-interface telescope of the present disclosure requires a much smaller maneuver, perhaps only a degree or two, which may dramatically reduce the impact of the maneuver on vehicle operations.

Figure 9:
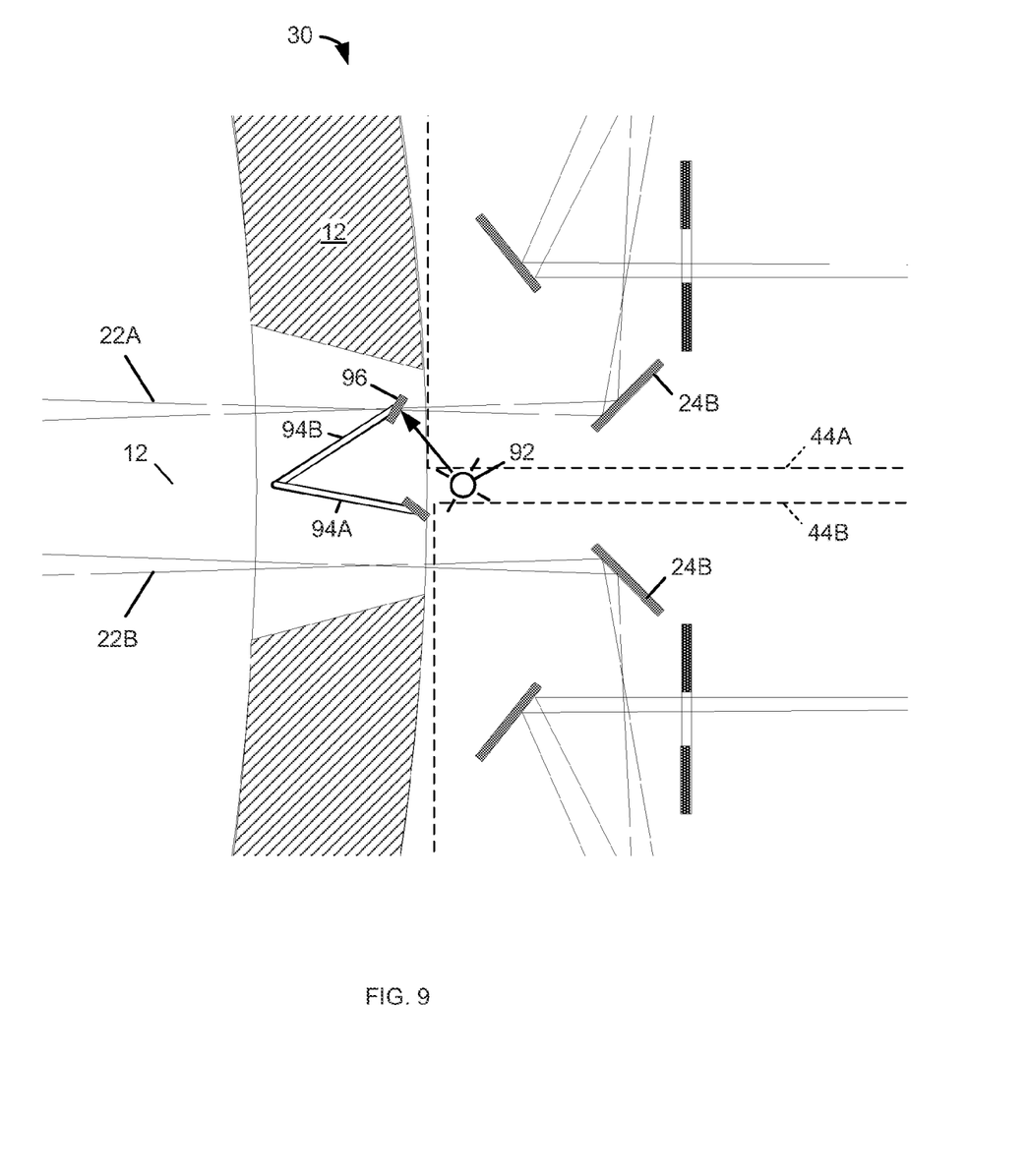
FIG. 9 is depicts a common calibration source configured for use with the multiple-sensor common-interface telescope of FIG. 2 according to certain aspects of this disclosure.

FIG. 9 is depicts a common calibration source 92 configured for use with the multiple-sensor common-interface telescope 30 of FIG. 2 according to certain aspects of this disclosure. FIG. 9 is an enlargement of the center of telescope 30 from FIG. 2. A calibration source 92 is positioned in a location that is out of the optical paths of the instruments 44A, 44B. In the embodiment of FIG. 9, the calibration source 92 is positioned on the centerline 12 between the two instruments 44A, 44B. A movable mirror assembly 94 is positioned such that in position 94A, the assembly is out of the optical paths while in position 94B the mirror 96 is positioned in one of the optical paths, shown as path 22A in FIG. 9. In certain embodiments, a plurality of movable mirror assemblies 94 are provided such that more than one instrument 44A, 44B can be simultaneously calibrated from the common calibration source 92. It will be obvious to one of skill in the art that the calibration source 92 may be placed in a variety of locations and that a variety of mechanisms may be employed to selectively place the mirror 96 in one or more of the optical paths 22A, 22B.

The concepts disclosed herein provide a system and method of sharing a FOV of a telescope. The system utilizes a common primary and secondary mirror and comprises at least two tertiary mirrors each configured to create an exit pupil and an image on a flat image surface. In certain embodiments, the system includes folding mirrors to position the exit pupil and image surface behind the primary mirror. In certain embodiments, the system comprises at least two optical subsystems that are identical such that the light received at a mounting interface of the at least two systems are identical in focal length and/or spectral characteristics.

The previous description is provided to enable a person of ordinary skill in the art to practice the various aspects described herein. While the foregoing has described what are considered to be the best mode and/or other examples, it is understood that various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the terms "a set" and "some" refer to one or more. Pronouns in the masculine (e.g., his) include the feminine and neuter gender (e.g., her and its) and vice versa. Headings and subheadings, if any, are used for convenience only and do not limit the invention.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The word "reflect" as used herein refers to a redirection of a beam of light that is incident upon a surface of a reflecting object such that the light does not pass through the reflecting object. It is known to those of skill in the art that there is some loss of energy in the reflecting process and that the total energy of the reflected light is lower than the total energy of the incident light beam.

The term "optical" covers electromagnetic radiation from ultraviolet to infrared, including wavelengths in the range of 10 nanometers to 1 millimeter and includes, but is not limited to, light visible to the human eye, which covers the range of 380-760 nanometers.

Terms such as "top," "bottom," "front," "rear" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference. Designation of a particular surface, for example a front surface of a mirror, defines the local frame of reference, for example the regions that are in front of and behind the mirror, to be consistent with this designation.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. A phrase such an embodiment may refer to one or more embodiments and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A telescope comprising:
    a primary mirror configured to accept at a front surface incoming light from a field of view (FOV) and reflect the incoming light;
    a secondary mirror coupled to the primary mirror in front of the primary mirror and configured to accept the light reflected by the primary mirror and to reflect the light from the primary mirror;
    a plurality of first planar mirrors disposed behind the primary mirror, each first planar mirror configured to accept only a portion of the light, reflected by the secondary mirror, that corresponds to a portion of the FOV and to reflect the portion of the light outwardly away from a center axis of the telescope such that none of the portion of the light crosses the center axis, the portions of the FOV being mutually exclusive;
    a plurality of tertiary mirrors coupled to and disposed behind the primary mirror, and configured to accept the portions of the light from the first planar mirrors at respective tertiary mirrors and to reflect the portions of the light inwardly toward the center axis and forwardly toward the primary mirror; and
    a plurality of second planar mirrors disposed behind the primary mirror, and configured to accept the portions of the light from the tertiary mirrors at respective second planar mirrors and to reflect the portions of the light in a rearward direction so as to form respective real exit pupils farther behind the primary mirror than are the plurality of tertiary mirrors, wherein each exit pupil does not overlap another exit pupil; and
    wherein the primary mirror and the secondary mirror are aligned on the center axis.

2. The telescope of claim 1, further comprising:
    a support structure coupled to the primary mirror, the plurality of tertiary mirrors, the plurality of first planar mirrors, and a plurality of identical mounting interfaces, the support structure configured to position the tertiary mirrors and first planar mirrors so as to direct the respective optical paths through the plurality of mounting interfaces.

3. The telescope of claim 2, wherein each mounting interface provides identical mechanical attachment features.

4. The telescope of claim 2, wherein the lengths of the optical paths from the primary mirror to each of the plurality of mounting interfaces are identical.

5. The telescope of claim 4, wherein the positions of the exit pupils with respect to the respective mounting interfaces are identical.

6. The telescope of claim 2, wherein the optical characteristics of the light are identical at the plurality of mounting interfaces.

7. The telescope of claim 6, wherein the spectral filtering of the incoming light is identical at the plurality of mounting interfaces.

8. The telescope of claim 6, wherein the focal ratios at the plurality of mounting interfaces are identical.

9. The telescope of claim 1, wherein:
the primary mirror is a concave reflector;
the second mirror is a convex reflector; and
the plurality of tertiary mirrors are concave reflectors.

10. The telescope of claim 1, wherein at least two of the mutually exclusive portions of the FOV are identically shaped.

11. The telescope of claim 1, wherein each tertiary mirror is disposed behind the primary mirror at a distance from the center axis that is less than a radius of the primary mirror.

12. A telescope comprising:
a primary mirror configured to accept at a front surface incoming light from a field of view (FOV) and reflect the incoming light;
a secondary mirror coupled to the first mirror in front of the primary mirror, the second mirror configured to accept the light reflected by the primary mirror and to reflect the light from the primary mirror;
a plurality of optical subsystems disposed behind the primary mirror, each subsystem configured to accept only a portion of the incoming light that corresponds to a portion of the FOV, the portions of the FOV being mutually exclusive, each optical subsystem comprising:
a first planar mirror configured to accept the portion of the light from the secondary mirror and to reflect the portion of the light outwardly away from a center axis of the telescope such that none of the portion of the light crosses the center axis;
a tertiary mirror configured to accept the portion of the light from the first planar mirror and to reflect the portion of the light inwardly toward the center axis and forwardly toward the primary mirror;
a second planar mirror configured to accept the portion of the light from the tertiary mirror and to reflect the portion of the light in a rearward direction; and
a structure coupled to the primary mirror, the structure configured to couple to and position the tertiary mirror and the first and second planar mirrors at respective points along an optical path so as to cooperate with the primary and secondary mirrors to form a real exit pupil farther behind the primary mirror than is the tertiary mirror; and
wherein each exit pupil does not overlap another exit pupil; and
wherein the primary mirror and the secondary mirror are aligned on the center axis.

13. The telescope of claim 12, wherein:
the FOV comprises M identically shaped, mutually exclusive portions;
each subsystem is configured to accept incoming light from one of the M identically shaped, mutually exclusive portions;
the plurality of subsystems each comprises an identical mounting interface.

14. The telescope of claim 13, wherein the plurality of subsystems are identical.

15. The telescope of claim 14, wherein the optical characteristics of the light arriving at each of a plurality of image surfaces are identical.

16. The telescope of claim 12, wherein each tertiary mirror is disposed behind the primary mirror at a distance from the center axis that is less than a radius of the primary mirror.

17. A method of sharing a field of view (FOV) of a telescope, the method comprising the steps of:
reflecting with a front surface of a primary mirror incoming light from the FOV;
reflecting with a secondary mirror, disposed in front of and aligned with the primary mirror on a center axis of the telescope, the light reflected by the primary mirror;
with a plurality of first planar mirrors disposed behind the primary mirror, reflecting the light, incident from the secondary mirror, outwardly away from a center axis of the telescope such that none of the light reflected by the plurality of first planar mirrors crosses the center axis, each first planar mirror reflecting only a portion the light that corresponds to a portion of the FOV, the portions of the FOV being mutually exclusive;
reflecting each of the portions of the light inwardly toward the center axis and forwardly toward the primary mirror with a tertiary mirror disposed behind the primary mirror; and
reflecting each of the portions of the light rearward with a second planar mirror so as to form, in cooperation with the primary mirror, the secondary mirror, one of the tertiary mirrors, and one of the first planar mirrors, an optical path having a real exit pupil that (i) is farther behind the primary mirror than is any of the tertiary mirrors and (ii) does not overlap with any other real exit pupil.

18. The method of claim 17, wherein at least two of the portions of the FOV are identical in shape and size.

* * * * *